United States Patent Office

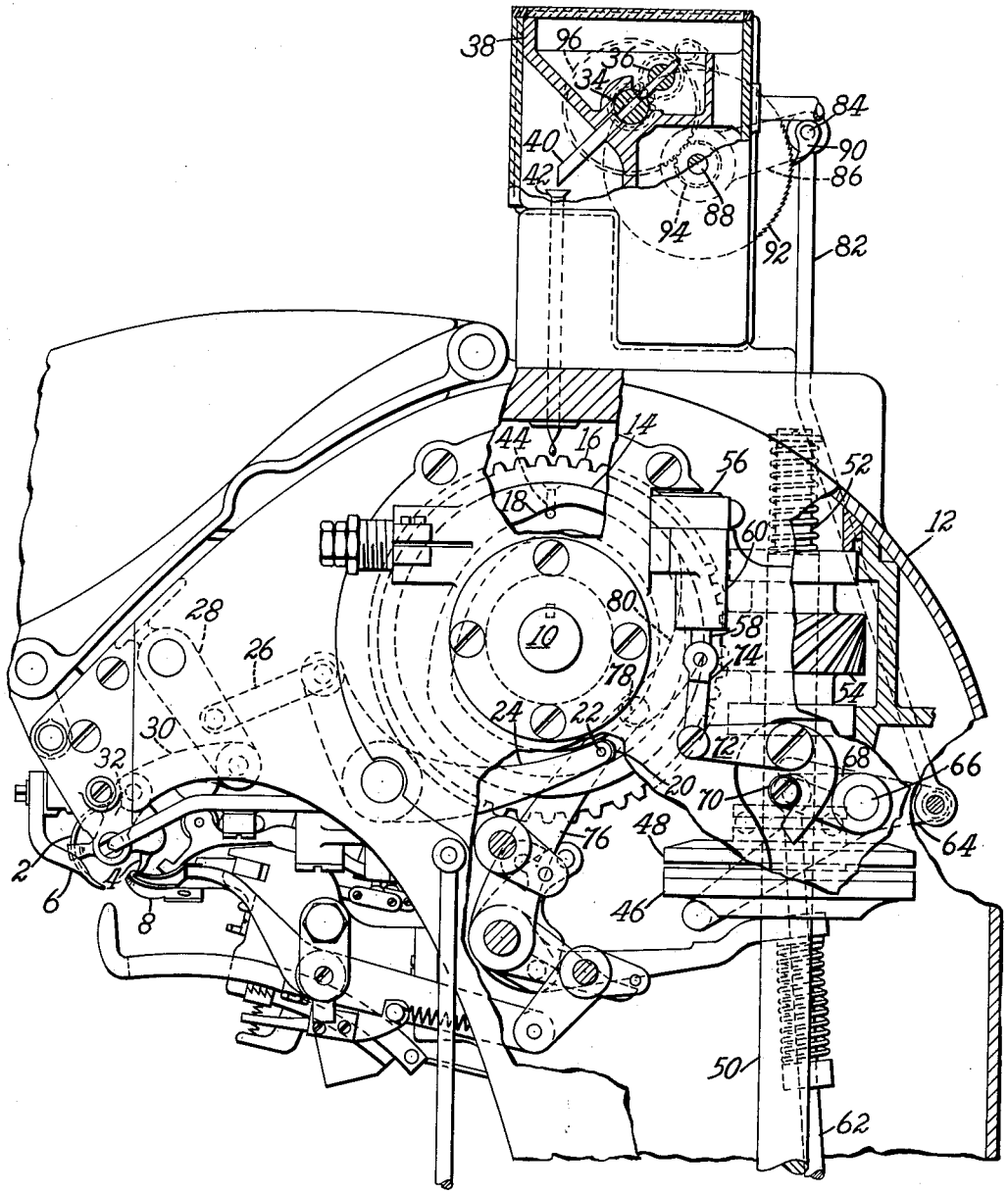

2,722,187
Patented Nov. 1, 1955

2,722,187

LUBRICATING APPARATUS FOR SHOE MACHINES

James P. Carter, Beverly, Mass., assignor to United Shoe Machinery Corporation, Flemington, N. J., a corporation of New Jersey Application July 1, 1953, Serial No. 365,401

2 Claims. (Cl. 112—256)

This invention relates to improvements in shoe machines equipped with automatic lubricating apparatus and is particularly intended for use with cam driven shoe sewing machines, the cams of which are mounted on a horizontal shaft and are provided with continuous slots entering their side wall faces. As hereinafter described the lubricating apparatus employed is similar to that disclosed in United States Letters Patent No. 2,621,758, granted December 16, 1952, upon application of Percy White.

In the use of the patented apparatus with a shoe sewing machine, a volumetric measuring device applies a minute quantity of lubricant to each actuating mechanism in the machine, the arrangement of the apparatus being such that one or two drops only of lubricant are measured after 600 starting operations on shoes in the machine. Such a small quantity of lubricant is insufficient to provide spray lubrication for all the parts of the mechanism, especially for the surfaces of side face entering slots of rotary cams, lubrication of which is dependent entirely upon gravity flow and to deliver the lubricant with certainty to the cam slot is a problem.

On this account the face cam slots in a sewing machine so lubricated have been subject to excessive wear and to greatly reduced durability as compared with cam slots having adequate lubrication.

The object of the invention is to improve the operation of the lubricating apparatus disclosed in the patent by modifying the machine in a manner which favors application with certainty by gravity flow of minute quantities of lubricant to the inner surfaces of face cam slots in a machine of the type employed for sewing shoes. As a result the useful life of the cams in the machine is increased and the extent of wear is substantially reduced. The illustrated machine accordingly is provided with a horizontal operating shaft and actuating mechanisms driven by the shaft including one or more circular cams, each having a continuous slot in a side face and a horizontal cam roll engaging the slot together with lubricating apparatus, a driving and stopping mechanism for bringing the operating shaft to rest and treadle actuated connections for controlling both the lubricating apparatus and the driving and stopping mechanism, in which the cam has entering its periphery a radial lubricant conducting passageway arranged at a point directly beneath a distributing conduit for the lubricating apparatus when the sewing shaft reaches a stopped position. To cause lubricant to be expelled into the conduit as the treadle connections are actuated and to be retarded in its movement from the lubricating apparatus to the passageway in the cam until the stopping mechanism completes its operation in bringing the sewing shaft to rest, the length of the conduit is made with a predetermined minimum sufficient to insure that the time of traverse of the lubricant through the conduit is greater than that required by the stopping mechanism. In this way the lubricant is kept from dropping against the blank periphery of the cam where it may be thrown off by centrifugal force.

These and other features of the invention, as hereinafter described and claimed, will readily be apparent from the following detailed specification and accompanying drawing in which:

The single figure is a sectional side view partly broken away to show the underlying parts, looking from the right, of a portion of a shoe sewing machine provided with a lubricating apparatus, embodying the features of the present invention.

The machine illustrated in the drawing is a shoe inseam sewing machine similar to that disclosed in United States Letters Patent No. 2,041,945, granted May 26, 1936, upon application of Alfred R. Morrill and is equipped with lubricating apparatus similar to that disclosed in the White patent above identified. The lubricating apparatus of the White patent is intended to measure by volume a minute quantity of lubricant for the connections in each actuating mechanism of the machine shown in the Morrill patent, the measured quantity of lubricant being insufficient to produce appreciable spray by admixture with air surrounding the lubricated mechanism when the lubricant impinges on the moving parts of the mechanism. For this reason the effectiveness of the lubricating apparatus is dependent upon gravity flow of lubricant along surfaces of the parts upon which it impinges.

Referring more particularly to the drawing, the machine is provided with the usual sewing devices for operating on a shoe, including a curved hook needle 2, a curved awl 4, a channel guide 6, and a welt guide 8. These sewing devices are actuated from a main horizontal operating and sewing shaft 10 rotatably mounted in a machine enclosing frame 12. The machine frame 12 encloses the sewing devices which partly project from the frame and the actuating mechanisms therefor so nearly completely that it is difficult, if not impossible, to provide proper lubrication for them by the usual manual methods. The actuating mechanisms for the sewing devices of the machine include cams 14 and 16 on the operating shaft, having one or more continuous slots 18 entering their side face walls. Engaged within each cam slot 18 is a roll 20 rotatably mounted on a horizontal stud 22 carried by a cam lever 24. The cam lever is connected by a link 26, a lever 28 and a link 30 to a needle actuating segment 32. Other cam levers actuate other sewing devices by similar connections.

The lubricating apparatus is secured to the top surface of the machine frame 12 above the cams 14 and 16 and comprises, briefly, a pair of horizontal shafts 34 and 36 rotating in a bracket 38. The lubricating shaft 34 is provided with a number of transverse holes each having a plunger slidingly disposed therein. When the shaft 34 is rotated a projecting pin on the shaft 36 enters each hole in the shaft 34 and reciprocates the plunger, the bracket 38 in which the shafts rotate forming an enclosing lubricant reservoir around them so that reciprocation of each plunger 34 causes measured quantities of lubricant to be expelled from its hole and to be carried into a receiving tube 40 alined with the hole in the shaft 34. From the tube 40 one or two drops of lubricant enter the upper end of a distributing conduit 42 and are caused to flow by gravity to the parts of the mechanisms to be lubricated. For certain of the operating parts in the machine it is sufficient to locate the lower end of the distributing conduit above the periphery of a cam in the particular mechanism, rotation of the cam causing the lubricant to be thrown off by centrifugal force onto the parts of the mechanism. On account of the small quantity of lubricant measured, however, the lubricant is not broken up into an appreciable volume of air supported spray so that only those connections outside the periphery of the cam have lubricant applied to them. Accordingly, lubricant is not conducted to the inner surfaces of each side face cam slot 18 or to the cam roll 20 in sufficient quantity to prevent excessive wear and substantial loss in durability of the cam and its roll.

In a machine embodying the illustrated invention an extremely effective embodiment has been provided to insure application of adequate quantities of lubricant to the inner surfaces of a slot entering a side face of an actuating cam in a machine of the type referred to, without detracting in any way from effective lubrication of connections in the actuating mechanisms. Successful lubrication of the improved machine is dependent in part upon accurate operation of a driving and stopping mechanism with which the machine already is equipped, for bringing the sewing shaft to rest uniformly in a predetermined stopping position and in part upon the formation of a radial passageway entering through the periphery of the cam and into the cam slot itself, in such a way that a measured quantity of lubricant is given an easy path for gravity flow from the lower end of the distributing conduit directly into the cam slot, the radial passageway being indicated at 44, having a flaring outer end disposed directly beneath the pointed lower end of the distributing conduit 42.

The driving and stopping mechanism comprises a main driving clutch having a driving member 46, a driven member 48 rotating respectively with a driving shaft 50 and a driven shaft 52. The driven shaft is rotatable in bearings in the frame and carries a helical gear 54 engaging gear teeth in the periphery of the cam 16 which is secured to the shaft 10. For stopping the machine a reverse driving clutch is provided, as more fully described in the Morrill patent and is controlled in part by a bell crank 56 provided with an opening arranged to receive a lock bolt 58 mounted for vertical sliding movement in a spring pressed slide or lock bolt carrier 60.

The driving and stopping mechanism is controlled by treadle connections including a treadle rod 62 connected at its upper end to one arm of a lever 64, secured to and rotating with a shaft 66. The lever 64 has a forked arm bearing against the upper surface of the driven clutch member 48, so that when the treadle rod 62 is depressed the main driving clutch is engaged. At the same time an arm 68 on the shaft 66 carrying a roll 70 moves downwardly along a cam surface of a bell crank 72. The bell crank 72 is connected to a link 74 which in turn is connected to the bolt lock 58. Downward movement of the roll 70 causes the lock bolt 58 to be withdrawn from the bell crank 56 allowing the bell crank 56 to oscillate idly without causing engagement of the reverse driving mechanism. When the treadle rod 62 is released the main driving clutch is disengaged and the lock bolt enters the opening in the bell crank 56 to reverse rotation of the sewing shaft and to bring it to rest in a short elapsed interval of time at a predetermined stopped position. The position of rest for the sewing shaft is determined accurately by a positive stop arm 76 carrying a follower 78 which enters a closed ended slot 80 in one of the cams on the sewing shaft 10. During forward rotation of the sewing shaft the follower 78 is held out of engagement with its co-operating cam, in the manner more fully described in the Morrill patent.

The control connections for the driving and stopping mechanism also actuate the lubricating apparatus through an arm of the lever 64, which has pivotally connected to it the lower end of a link 82, the upper end of which is similarly connected by a pin 84 to an arm 86, secured to a shaft 88. Rotatably mounted on the pin 84 is a pawl 90 engaging ratchet teeth in a wheel 92. When the control rod 62 of the control connections is depressed the pawl 90 moves idly over the ratchet wheel 92. When the treadle rod 62 is released the pawl 90 drives the ratchet wheel and a pinion 94 secured thereto with which meshes a gear 96 secured in turn to the plunger shaft 34. The arrangement is such that the lubricating apparatus may be adjusted to expel one or two drops of lubricant after the machine has been stopped 600 times. During the interval at which the machine is stopped at the 600th time, the lubricant will quickly find its way by gravity through the distributing tube 42 and the cam passageway 44 into the inner surfaces of the slot 18. To insure that the flow of lubricant from the lubricating apparatus to the cam passageway 44 will be retarded during the short interval needed by the stopping mechanism to operate until the sewing shaft reaches a position of rest, with the passageway directly beneath the lower end of the conduit 42, the conduit's minimum length is predetermined by the requirement and is made sufficient to accomplish the desired result. When the machine is restarted after the lubricant has been expelled the cam roll 20 will spread the lubricant in a suitable manner throughout the inner surfaces of the cam slot, while at the same time centrifugal force will also throw off minute quantities of oil onto the other connections of the machine. During the remainder of the times during which the machine is started and stopped the lubricant thus supplied will maintain the parts in effective running order without any danger of overlubrication in a manner to cause surplus lubricant to drop onto a shoe being operated upon or onto the operator of the machine.

The nature and scope of the invention having been indicated and a particular embodiment having been described, what is claimed is:

1. A shoe machine having an enclosing main frame, a horizontal operating shaft within the frame, devices for operating upon a shoe, mechanisms driven by the operating shaft for actuating the operating devices, including a circular cam on the operating shaft having a continuous slot in one side face, a cam roll engaged within the slot in the cam, and actuating connections between the cam roll and one of the operating devices, lubricating apparatus above the cam having means for expelling lubricant at a rate on the order of one drop for several hundred shoes sewn and a lubricant distributing conduit of predetermined length mounted in the frame with its lower end disposed above the periphery of the cam to deliver lubricant by gravity flow to the cam, driving and stopping mechanism for bringing the operating shaft uniformly to rest in a predetermined stopped position of the cam and treadle actuated connections for controlling both the driving and stopping mechanism and the lubricating apparatus to cause the operating shaft to be driven when the treadle connections are actuated in one direction and to bring the operating shaft to rest when the treadle connections are actuated in the other direction and simultaneously with the actuation of the treadle to bring the operating shaft to rest to cause the lubricating apparatus to expel lubricant, in combination with a radial lubricant conducting passageway entering the periphery of the cam at a point directly beneath the lower end of the distributing conduit when the operating shaft is in stopped position to cause the lubricant from the conduit to flow by gravity through the conducting passageway into the cam slot, the distributing conduit being of sufficient length to retard the lubricant in its gravity movement from the lubricating apparatus to the cam passageway after actuation of the treadle to bring the shaft to rest until the cam reaches its stopped position.

2. A shoe sewing machine having an enclosing main frame, a horizontal sewing shaft within the frame, sewing devices including a curved hook needle projecting from the frame, mechanisms driven by the sewing shaft for actuating the sewing devices, including a circular cam on the sewing shaft having a continuous slot in one side face, a cam roll engaged within the slot in the cam, actuating connections between the cam roll and one of the sewing devices, lubricating apparatus above the cam having means for expelling lubricant at a rate on the order of one drop for several hundred shoes sewn, and a lubricant distributing conduit of predetermined length mounted in the frame with its lower end disposed above the periphery of the cam to deliver lubricant by gravity flow to the cam, driving and stopping mechanism for bringing the sewing shaft uniformly to rest in a predetermined stopped position of the cam, and treadle actuated connections for controlling both the driving and stopping mechanism and the lubricating apparatus to cause the sewing shaft to be driven when the treadle connections are depressed and to bring the sewing shaft to rest when the treadle connections are released, and simultaneously with the actuation of the treadle to bring the operating shaft to rest to cause the lubricating apparatus to expel lubricant, in combination with a radial lubricant conducting passageway entering the periphery of the cam at a point directly beneath the lower end of the distributing conduit when the sewing shaft is in stopped position to cause the lubricant from the conduit to flow by gravity into the conducting passageway, the distributing conduit being of sufficient length to retard the lubricant in its gravity flow from the lubricating apparatus to the cam passageway after actuation of the treadle to bring the shaft to rest until the cam reaches its stopped position.

References Cited in the file of this patent

UNITED STATES PATENTS

| | | |
|---|---|---|
| 1,028,176 | Ambler | June 4, 1912 |
| 2,621,758 | White | Dec. 16, 1952 |